Figure 12:
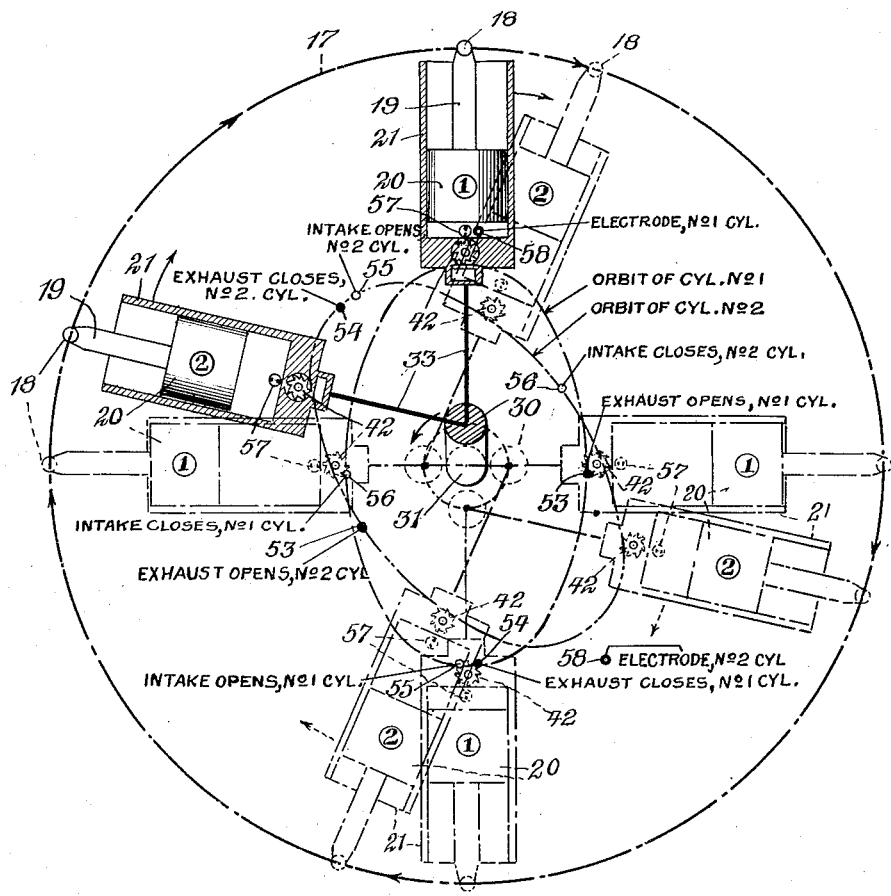

March 31, 1936.  N. A. LEWIS  2,036,060
ROTARY INTERNAL COMBUSTION ENGINE
Filed July 25, 1932  4 Sheets-Sheet 1
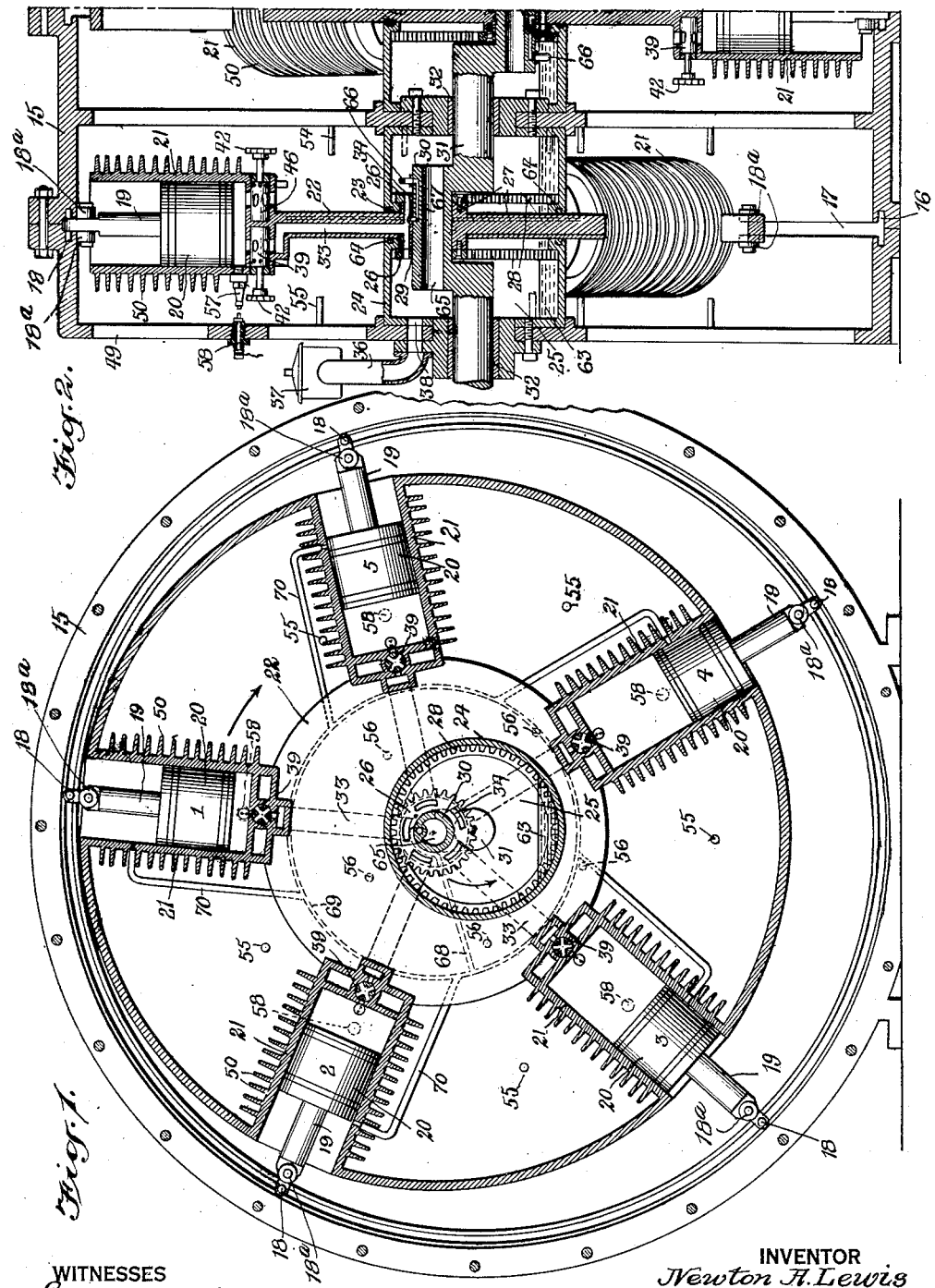
WITNESSES
INVENTOR
Newton A. Lewis
BY
ATTORNEYS

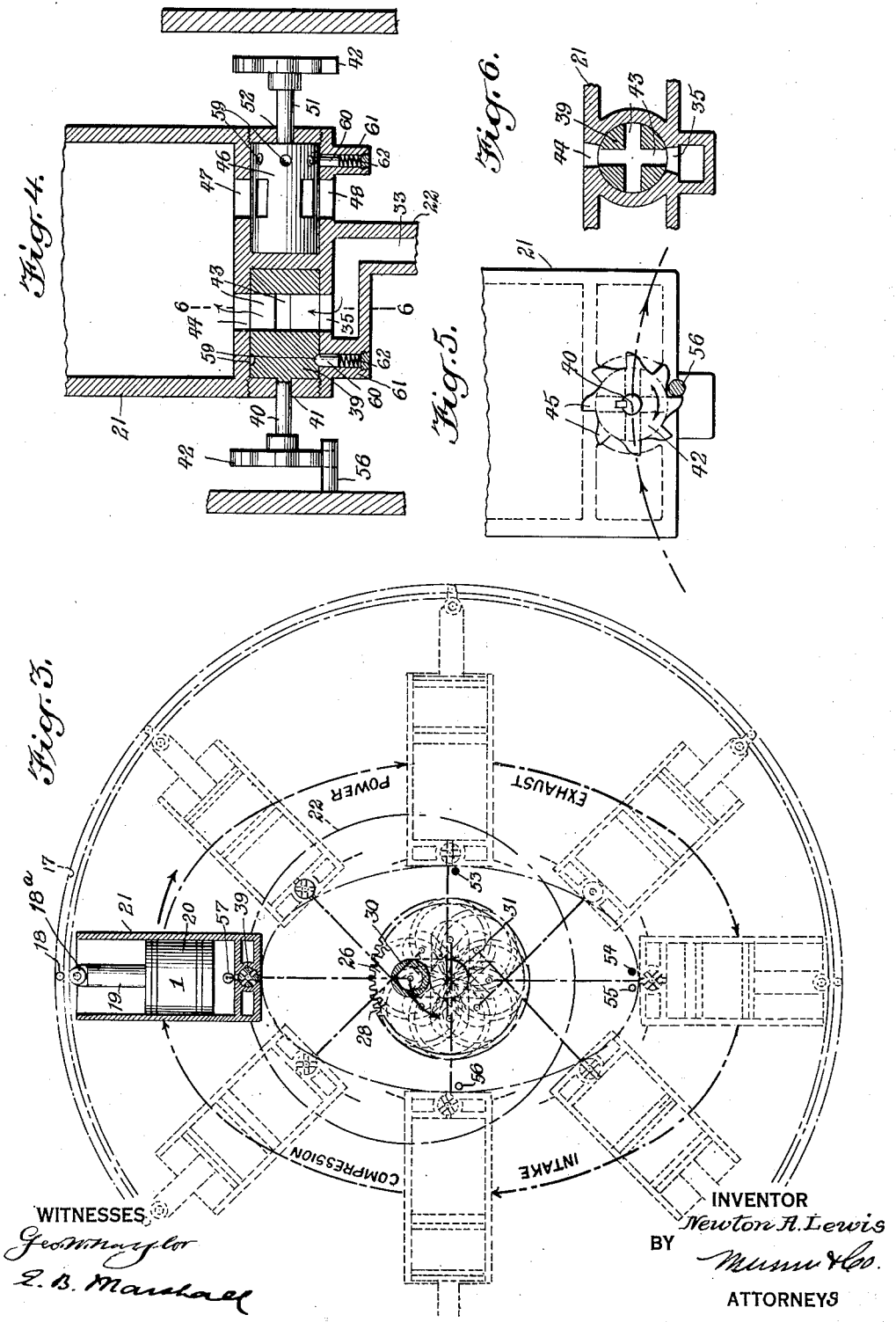

March 31, 1936.  N. A. LEWIS  2,036,060
ROTARY INTERNAL COMBUSTION ENGINE
Filed July 26, 1932  4 Sheets-Sheet 3
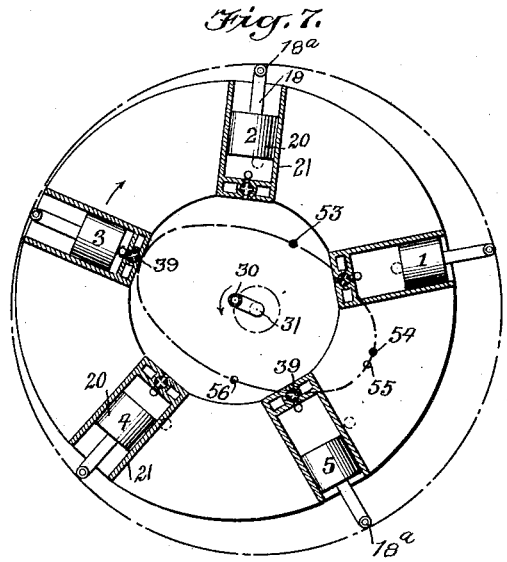
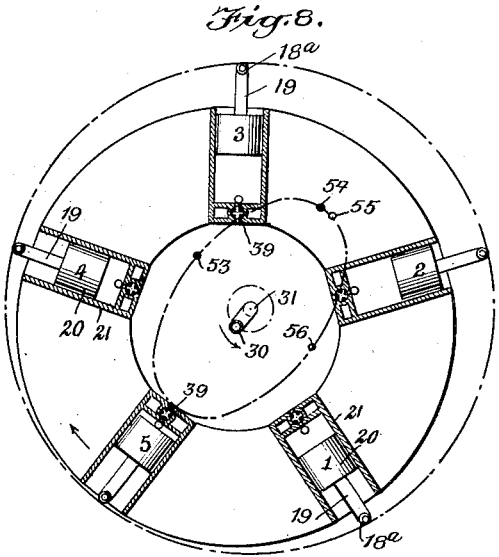
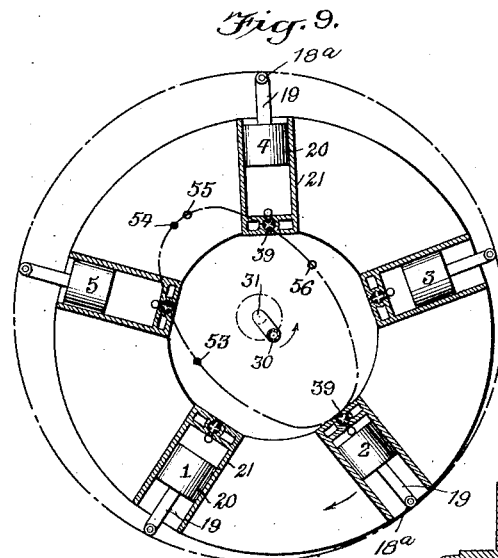
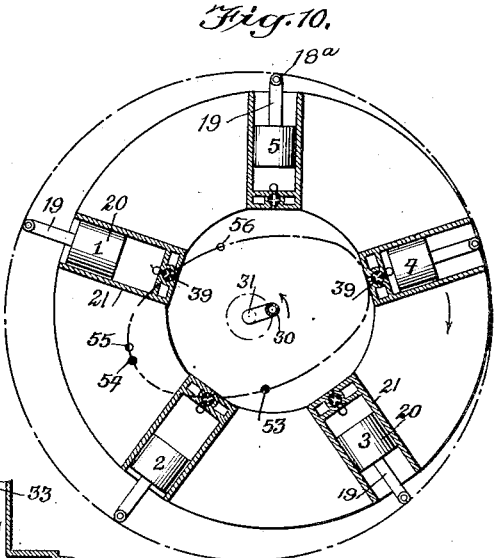
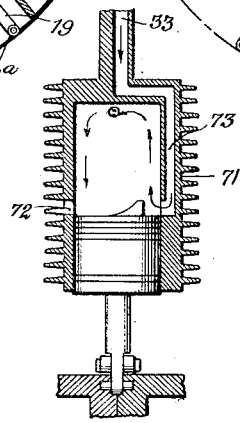
WITNESSES
INVENTOR
Newton A. Lewis
BY
ATTORNEYS March 31, 1936.  N. A. LEWIS  2,036,060

ROTARY INTERNAL COMBUSTION ENGINE

Filed July 26, 1932  4 Sheets-Sheet 4

WITNESSES

INVENTOR
Newton A. Lewis
BY
Munn & Co.
ATTORNEYS

Patented Mar. 31, 1936

2,036,060

UNITED STATES PATENT OFFICE 2,036,060

ROTARY INTERNAL COMBUSTION ENGINE

Newton A. Lewis, White Plains, N. Y.

Application July 26, 1932, Serial No. 624,849

3 Claims. (Cl. 123—44)

An object of the invention is to provide a rotary internal combustion engine having cylinders secured for rotating with a gear having a bearing in which a crank of a shaft is journaled, the said gear meshing with a gear having inner teeth which serves to rotate the shaft in one direction as the cylinders rotate in the opposite direction.

The invention also has for an object to provide an engine of the type referred to in which the rotor will rotate in one direction and the main shaft will rotate in the opposite direction, cylinders being secured for rotating with the rotor and there being pistons disposed in the cylinders which are connected by piston rods with guides which travel in a slip ring on the stator.

A further object of the invention is to provide the cylinders with inlet and exhaust valves which are opened and closed by means on the valves which operatively engage members on the stator as the rotor and the cylinders rotate.

The invention also comprehends an engine of the type referred to having a gear secured to the rotor which meshes with an internal gear secured to the stator, means being provided for feeding a combustible mixture to the cylinders carried by the rotor through an inlet opening in the rotor adjacent the gear which is secured to the rotor. Means are also provided for lubricating the pistons in the cylinders and the guides for connecting the piston rods with the slip ring on the stator through an inlet disposed adjacent the gear on the rotor. Means are also provided to lubricate the gears.

The invention further comprehends an engine of the type referred to in which the rotor is provided with a plurality of cylinders connected with the stator by piston rods, means being provided which will give each cylinder an elliptical movement as the rotor rotates relatively to the stator.

The invention still further comprehends a rotary internal combustion engine of the type described in which stationary means on the stator cooperate with spark plugs on the cylinders as the cylinders rotate with the rotor to fire the charges in the cylinders.

The invention also includes a rotary internal combustion engine constructed in a manner which will keep the parts cool when the engine is operated.

Additional objects of the invention will appear in the following specification in which the preferred form of the invention is described.

In the drawings similar reference characters refer to similar parts in all the views, of which Figure 1 is a side sectional elevation of the invention, Figure 2 is a transverse sectional view of a modification similar to Figure 1, and showing in addition fragments of a second complete engine to indicate the idea that more than a single rotary internal combustion engine may be operatively connected to the same crank shaft, Figure 3 is a sectional diagrammatic view illustrating the movement of one of the cylinders during a complete rotation of the shaft, Figure 4 is an enlarged sectional fragmentary view illustrating the ports in one of the cylinders, with the valves commanding the ports, and illustrating the means for operating the valves, Figure 5 is a side elevation of Figure 4 illustrating the tooth wheel for rotating one of the valves, Figure 6 is a sectional view on the line 6—6 of Figure 4, Figures 7, 8, 9 and 10 are side sectional views illustrating the orbits of movement of four of the cylinders, Figure 11 is a side sectional view illustrating a two-cycle type of cylinder which may be substituted for the four-cycle type cylinders which are illustrated in Figures 1, 2, 3, 4, 7, 8, 9 and 10, and Figure 12 is a diagrammatic view showing the orbit of movement of dual cylinders and the positions of the pistons throughout these orbits. Only two cylinders and their orbits are illustrated to avoid confusion which it would appear would result from an attempt to illustrate on the same figure the orbits of all the cylinders.

By referring to the drawings it will be seen that a stator 15 is provided having an annular groove 16 with a guideway 17 in which guides 18 on piston rods 19 are adapted to travel, the piston rods 19 being secured to pistons 20 mounted to reciprocate in cylinders 21. There are rollers 18ª on the piston rods 19 which engage the inner sides of the stator 15 adjacent the annular groove 16. There are five cylinders 21 shown in the drawings, these cylinders being disposed radially and being spaced apart, the cylinders being secured for rotating with a rotor 22 in the form of a disc, as best shown in Figures 1 and 2. This rotor 22 extends through an annular guideway 23 in an inner casing 24 of the stator 15, the said inner casing 24 forming a chamber 25 serving as a crank case. Secured to the rotor 22 there are two gears 26, one being disposed at each side of the rotor 22 and being secured thereto by means of bolts 27. The gears 26 mesh with inner gears 28 in the inner casing 24, the gears 28 and 26 having a ratio two to one. The gears 26 and the rotor 22 have a bearing 29 in which is disposed a crank 30 on a shaft 31, the shaft 31 being journaled in bearings 32 in the stator 15.

As will best be seen by referring to Figures 1 and 3 of the drawings, with the rotor 22 rotating clockwise, the shaft 31 will rotate counter-clockwise and the rotor 22 will make one complete revolution for each revolution of the shaft 31. However, the rotor 22, together with the cylinders 21, will make one complete revolution around the crank 30 during each half revolution of the crank 30 and the shaft 31. Nevertheless, the rotor 22, together with the cylinders 21, will make only one-half a revolution relatively to the stator 15 during each half revolution of the shaft 31. This movement is due to the fact that the gears 28 and 26 have a two to one ratio and, with the rotary movement of the gears 26 as the crank 30 with the shaft 31 moves counter-clockwise, the cylinder 21 having the piston 20 marked "1" for identification will move 180° clockwise as the crank 30 moves 180° counter-clockwise relatively to the stator. Nevertheless, the cylinder 21 having the piston 20 marked "1" for identification, during this movement, will make a complete rotation around the crank 30, inasmuch as the crank 30 rotates in one direction, while the said cylinder 21 having the piston 20 marked "1" for identification rotates at the same speed in the opposite direction. It will also be understood that when the cylinder 21 having the piston 20 marked "1" for identification moves from the dead center 5° clockwise, the crank 30 will move 5° counter-clockwise due to the gears 26 and 28, and, therefore, the cylinder 21 having the piston 20 marked "1" for identification will be at an angle of 10° relatively to the crank 30. With the shaft 31 rotating 900 R. P. M. in one direction and the rotor 22 rotating 900 R. P. M. in the opposite direction, the relative speed of the shaft 31 and the rotor 22 will be 1800 R. P. M.

The rotor 22 has five channels or passageways 33 which lead from a transverse channel or passageway 34 through the rotor 22 and the gears 26 to ports 35 in the valve chambers, one of the said channels or passageways 33 leading to a port 35 in each of the cylinders. Connected with the inner casing 24 at a port 38 there is a pipe or communicating means 36 leading from a carburetor 37 and it will, therefore, be seen that a combustible mixture is fed to the ports 35 from the chamber 25 through the passageways 33 to the ports 35, each of which is controlled by a rotary valve 39. Each of the rotary valves 39 has a valve stem 40 journaled in a bearing 41 at a side of the cylinder 21, there being a tooth wheel 42 secured to the valve stem 40, as will best be seen by referring to Figures 4 and 5 of the drawings. As will be understood by referring to Figure 6, each of the rotary valves 39 has two passages 43 extending therethrough at right angles to each other and serving to connect the port 35 with a port 44 at each of the cylinders. Each of the tooth wheels 42 has eight teeth 45 disposed to be operatively engaged by pins 56 at the sides of the stator 15, the construction being such that the tooth wheel 42, together with the rotary valve 39, will be rotated one-eighth of a revolution as a tooth 45 engages each of the said pins. With this construction, the valve will be alternately opened and closed, as will be readily understood. As has been stated, the said valve 39 is an inlet valve, there being a similar outlet valve 46 which serves to connect an exhaust port 47 in each of the cylinders with an outlet port 48. All the valves 39 are preferably disposed at one side of the stator 15 to be engaged by one set of pins 56, while all the valves 46 are preferably disposed adjacent the other side of the stator to be engaged by another set of pins 54. The outlet ports 48 exhaust into the stator 15 between the inner casing 24 and the outer portions of the stator, the sides of the stator being preferably open at 49 to permit of the escape of the products of combustion, and also as a means of cooling the cylinders 21 which are provided with radiating ribs 50. Each of the valves 46 is provided with a valve stem 51 journaled in a bearing 52 and is provided with a tooth wheel 42 such as has been described.

The path of each of the cylinders 21 will be an ellipse, as will best be seen by referring to Figures 3, 7, 8, 9 and 10 of the drawings, where the orbits of each of the cylinders is shown. By referring to Figure 3 it will be seen that the cylinder 21 having the piston 20 marked "1" for identification will have in its orbit a pin 53 which will serve to rotate one-eighth of a revolution the tooth wheel 42 extending from the valve 46 to open communication through the said valve 46 from the port 47 to the port 48. The said tooth wheel 42 will engage the said pin 53 at the end of the power stroke of the cylinder 21 having the piston 20 marked "1" for identification. The exhaust will continue until the tooth wheel 42 on the valve 46 engages with the pin 54 which will rotate the valve 46 one-eighth of a revolution to close communication between the ports 47 and 48. Immediately thereafter the tooth wheel 42 on the rotary valve 39 will engage a pin 55 to rotate the rotary valve 39 to permit a combustible mixture to pass from the channel or passageway from the port 35 to the port 44, through the rotary valve 39 and the said rotary valve 39 will remain open until its tooth wheel 42 engages with the pin 56, which will rotate the rotary valve 39 to close communication between the ports 35 and 44 at the end of the intake stroke, after which the combustible mixture will be compressed and fired in a manner which will shortly be described.

It will be seen by referring to Figure 3, that the pins 53, 54, 55 and 56 are disposed in the orbit of movement of the cylinder 21 having the piston 20 marked "1" for identification. Figure 3 shows in dotted lines the various positions of the cylinder 21 having the piston 20 marked "1" for indentification during a complete revolution of the rotor. In a similar way Figure 7 shows the orbit of movement of the cylinder 21 having the piston 20 marked "3" for identification during a complete revolution of the rotor, the teeth on the wheel 42 on the valve 39 contacting with the pins 55 and 56 and the teeth on the tooth wheel 42 of the valve 46 contacting with the pins 53 and 54 in the manner described. In a similar way, Figure 8 shows the orbit of the cylinder 21 having the piston 20 marked "5" for identification, together with the pins 53, 54, 55 and 56. Figure 9 shows the orbit of the cylinder 21 having the piston 20 marked "2" for identification, together with the pins 53, 54, 55 and 56, and Figure 10 shows the orbit of the cylinder 21 having the piston 20 marked "4" for identification, together with the pins 53, 54, 55 and 56. Therefore, it will be seen that each of the cylinders in the engine which has been described is of the four-cycle type and that each cylinder will fire once during one complete revolution of the rotor and the shaft.

Figures 3, 7, 8, 9 and 10 of the drawings show the cylinders and the crank 30 at dead center. As has been made clear, with the movement of a cylinder five degrees in one direction, the crank will move five degrees in the opposite direction and, therefore, the cyinder will be in a position at ten degrees relative to the crank. This is preferably the firing position for each of the cylinders, each of the cylinders being provided with a spark plug 57 which, at firing position, is disposed in close proximity to an electrode 58 mounted on and insulated from a side of the stator 15. Therefore, it will be understood that, as the spark plug 57 moves to a position adjacent the electrode 58, a spark will jump from the electrode 58 to the spark plug 57, which will ignite the compressed combustible mixture in the cylinder in the customary manner.

There are five of the said spark plugs 57 and five of the said electrodes 58 which are disposed to fire the compressed combustible mixture in the cylinders. The cylinders preferably fire in the order of 1, 3, 5, 2 and 4, referring to the identification figures on the pistons in the cyinders.

As a means of limiting the rotation of the valves 39 and 46, each of the said valves is provided with recesses 59 which are engaged by a stud 60 disposed in a guide member 61 which is held yieldingly against the valve 46 by means of a spring 62. It will be understood that the stud 60 will serve to prevent too rapid rotation of the valves 39 and 46 and that, when either valve rotates to position one of the recesses 59 is engaged by the stud 60, and the further rotation of the valve will be retarded.

The chamber 25 serving as a crankcase will be supplied with oil 63 and the oil 63 will be fed by means of the gears 26 to the crank 30 and the gear 28, and also to the sides of the rotor 22 which extend through the annular guideway 23 in the inner casing 24. Packing rings 64 are disposed in recesses in the inner casing 24 at the rotor 22. The crank 30 has a transverse opening 65 therethrough to permit the compressed combustible mixture to pass therethrough to be fed through both sides of the transverse passageway 34 to the channel or passageway 33.

The pistons are oiled from the inner casing 24 by a dipper 66 which is carried by the crank 30 and serves to dip up some of the oil 63 in the bottom of the chamber 25 at each revolution of the shaft 31, the dipper 66 communicating with a transverse channel 67 which communicates with a radial channel 68, shown in Figure 1, the said radial channel 68 communicating with an annular channel 69 in the rotor 22 and the said annular channel 69 communicating with pipes 70 which are secured to the cylinders 21, so that, in the operation of the engine, the oil will be picked up by the dipper 66 and will be fed by centrifugal force to the cylinders 21. This oil, which is fed through the pipes 70, will not only lubricate the pistons, but the surplus oil will be directed by centrifugal force to the guides 18 and the slip ring 16.

By referring to Figure 2, it will be seen that two or more engine units may be mounted in the same casing and be secured for driving the same shaft 31. These units will preferably be oppositely disposed, as illustrated in Figure 2 of the drawings, to obtain a perfect balance.

In the engine which has been described, each cylinder is of the four-cycle type, but, it will be understood that, the same type of engine may be used with cylinders of the two-cycle type, one of which is shown in Figure 11, the construction being the customary one, with the cylinder 71 having an exhaust port 72 and a laterally inlet passage 73 which is fed from the channel or passageway 33, it being understood that the valves 39 and 46 are dispensed with in this construction. In other respects the cylinders of the engine will be such as has been described, with the exception that two spark plugs 57, together with two electrodes 58, will be provided for each cylinder 71, so that each cylinder 71 will fire twice with each complete revolution of the shaft 31. In this construction the compressed combustible mixture will preferably be fed to the inner chamber 24 under pressure, it being understood that in both types of engine the combustible mixture will be warmed in the chamber 25 in the inner casing 24.

In order to cause the rotor to travel in the desired path and to revolve the crank shaft in a direction opposite to the direction of movement of the rotor, the fixed internal gear 24 is provided concentrically in the stator, the pinion 26 is fixed concentrically in the center of the rotor and turns on the crank arm 30 of the crank shaft 31, the latter being centrally in the internal gear, and the pinion meshing with the internal gear. This causes or insures a movement of the rotor which maintains at all times one edge of the rotor next the stator and the several cylinders which are carried by the rotor are caused to move in different elliptical paths, and also the cylinder which is to be fired is always in contact with the stator at the time of firing. Furthermore, the explosion takes place in the respective cylinders at different points around the stator, and there are five explosions where there are five cylinders at each revolution of the rotor.

What is claimed is:

1. A rotary internal combustion engine including a circular stator, an internal gear having fixed concentric position in the center of the stator, a crank shaft mounted to turn in the center of the internal gear, a rotor, a pinion fixed to the rotor about the center of the rotor mounted to turn on a crank arm of said shaft and in mesh with the internal gear, and expansible power units connecting the stator and rotor and having sliding engagement with the stator.

2. A rotary internal combustion engine including a stator, a rotor eccentric to the stator, a series of radially disposed reciprocating expansible power units carried by the rotor and having sliding engagement with the stator, a crank shaft, means operatively connecting the crank shaft and the rotor, other means operatively connecting the power units with the stator, both of said means being operative to compel the crank shaft to turn in a direction opposite to the direction of the movement of the rotor.

3. A rotary internal combustion engine including a circular stator, a rotor mounted to turn in the stator, a circular series of radially positioned expansible power units carried by the rotor and having sliding engagement with the stator, an internal gear having fixed concentric position in the center of the stator, a crank shaft mounted to turn in the center of the internal gear, a pinion fixed to the rotor about the center of the rotor and mounted to turn on a crank arm of said shaft and in mesh with the internal gear, each of said units caused to move in a separate orbit and the orbits of the different units intersecting, and means causing the units to fire at different points around the stator.

NEWTON A. LEWIS.